United States Patent
O'Connor et al.

(10) Patent No.: US 12,433,998 B2
(45) Date of Patent: *Oct. 7, 2025

(54) ACTIVITY MODE FOR ARTIFICIAL PANCREAS SYSTEM

(71) Applicant: INSULET CORPORATION, Acton, MA (US)

(72) Inventors: Jason O'Connor, Acton, MA (US); Joon Bok Lee, Acton, MA (US); Trang Ly, Concord, MA (US); Todd Vienneau, Mississauga (CA); Yibin Zheng, Hartland, WI (US); Ashutosh Zade, San Diego, CA (US)

(73) Assignee: INSULET CORPORATION, Acton, MA (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/190,678

(22) Filed: Mar. 27, 2023

(65) Prior Publication Data
US 2023/0233765 A1    Jul. 27, 2023

Related U.S. Application Data

(63) Continuation of application No. 16/586,440, filed on Sep. 27, 2019, now Pat. No. 11,628,251.
(Continued)

(51) Int. Cl.
*A61M 5/172*     (2006.01)
*A61K 38/28*     (2006.01)
*A61M 5/142*     (2006.01)

(52) U.S. Cl.
CPC ........... *A61M 5/1723* (2013.01); *A61K 38/28* (2013.01); *A61M 5/14248* (2013.01);
(Continued)

(58) Field of Classification Search
None
See application file for complete search history.

(56) References Cited

U.S. PATENT DOCUMENTS 9,199,031 B2 *  12/2015  Yodfat  ............... A61M 5/14244
10,716,896 B2 *  7/2020  O'Connor  ............... G16H 20/17
(Continued)

FOREIGN PATENT DOCUMENTS

JP        2010507457 A        3/2010

*Primary Examiner* — Manuel A Mendez
(74) *Attorney, Agent, or Firm* — Goodwin Procter LLP

(57) ABSTRACT

A wearable drug delivery device, techniques, and computer-readable media that provide an application that implements a diabetes treatment plan for a user are described. The drug delivery device may include a controller operable to direct operation of the wearable drug delivery device. The controller may provide a selectable activity mode of operation for the user. Operation of the drug delivery device in the activity mode of operation may reduce a likelihood of hypoglycemia during times of increased insulin sensitivity for the user and may reduce a likelihood of hyperglycemia during times of increased insulin requirements for the user. The activity mode of operation may be manually activated by the user or may be activated automatically by the controller. The controller may automatically activate the activity mode of operation based on a detected activity level of the user and/or a detected location of the user.

18 Claims, 6 Drawing Sheets

Related U.S. Application Data

(60) Provisional application No. 62/738,531, filed on Sep. 28, 2018.

(52) U.S. Cl.
CPC ............ *A61M 2005/14252* (2013.01); *A61M 2205/18* (2013.01); *A61M 2205/3553* (2013.01); *A61M 2205/3584* (2013.01); *A61M 2205/502* (2013.01); *A61M 2205/52* (2013.01); *A61M 2230/201* (2013.01); *A61M 2230/63* (2013.01)

(56) References Cited

U.S. PATENT DOCUMENTS

| | | | |
|---|---|---|---|
| 11,628,251 B2 * | 4/2023 | O'Connor | A61B 5/6848 604/65 |
| 2011/0124966 A1 | 5/2011 | Uzawa | |
| 2016/0129182 A1 * | 5/2016 | Schuster | A61M 15/008 702/56 |
| 2018/0099092 A1 | 4/2018 | Roy | |

* cited by examiner

600

```
┌─────────────────────────────────────────────────────────────┐
│ Relax insulin delivery constraints to reduce an amount of  │  610
│ insulin to be delivered by a drug delivery device          │
└─────────────────────────────────────────────────────────────┘
                              ↓
┌─────────────────────────────────────────────────────────────┐
│ Lower thresholds for triggering hyperglycemia alarms        │  620
└─────────────────────────────────────────────────────────────┘
                              ↓
┌─────────────────────────────────────────────────────────────┐
│ Reduce the blood glucose set point                          │  630
└─────────────────────────────────────────────────────────────┘
                              ↓
                       ( TO 550 of FIG. 5 )
```

```
┌─────────────────────────────────────────────────────────────┐
│ Reduce maximum insulin delivery limit                       │  611
└─────────────────────────────────────────────────────────────┘
                              ↓
┌─────────────────────────────────────────────────────────────┐
│ Reduce basal input to the AP application                    │  612
└─────────────────────────────────────────────────────────────┘
                              ↓
┌─────────────────────────────────────────────────────────────┐
│ Increase the blood glucose set point                        │  613
└─────────────────────────────────────────────────────────────┘
                              ↓
                       ( TO 550 of FIG. 5 )
```

FIG. 6B

ACTIVITY MODE FOR ARTIFICIAL PANCREAS SYSTEM

CROSS-REFERENCE TO RELATED APPLICATIONS

This application is a Continuation of U.S. application Ser. No. 16/586,440, filed on Sep. 27, 2019, which claims priority to U.S. Provisional Application No. 62/738,531, filed on Sep. 28, 2018, the entire contents of which are incorporated herein by reference in their entirety.

TECHNICAL FIELD

The disclosed examples generally relate to medication delivery. More particularly, the disclosed examples relate to techniques, processes, devices or systems for managing operation of a wearable drug delivery device based on detected activity levels of a user, detected locations of the user, or learned behavior of the user.

BACKGROUND

Many conventional wearable drug delivery devices may include settings that allow for temporary adjustments to regular insulin delivery. The setting may include a setting that permits the suspension of delivery of insulin. These conventional drug delivery devices, however, may not enable adjusting the delivery of insulin, either automatically or through manual instruction, based on increased activity levels of the user or detected periods of increased insulin requirements.

Accordingly, there is a need for a wearable drug delivery device that may adjust insulin delivery based on manual request or automatically during detected increases in or expected increased activity levels of the user or based on detected locations of the user where adjustments to delivery were previously implemented.

SUMMARY

Disclosed is a wearable drug delivery device. The disclosed wearable drug delivery device is operable to deliver insulin to a user. The wearable drug delivery device includes a reservoir, a pump mechanism, an inertial measurement unit, and a controller. The reservoir configured to store insulin. The pump mechanism is coupled to the reservoir and operable to expel the stored insulin from the reservoir. The inertial measurement unit is operable to detect an activity level of the user. The controller is communicatively coupled to the pump mechanism and the inertial measurement unit. The controller, when in an activity mode of operation, is operable to receive an input from the inertial measurement unit, wherein the input indicates one or more measurements of motion. The controller may determine, from the received input, an activity level change. Based on the determined activity level change, the controller may modify an amount of insulin to be delivered by the pump mechanism. The controller may output a signal to the pump mechanism actuating delivery of the modified amount of insulin.

Disclosed is a non-transitory computer readable medium embodied with programming code executable by a processor, and the processor when executing the programming code is operable to perform functions. The functions performed by the processor include receiving inputs associated with an activity mode. The processor may evaluate the received inputs with reference to activity mode thresholds and determine whether the evaluated inputs exceed the activity mode thresholds. In response to the evaluated inputs exceeding the activity mode thresholds, the processor initiates the activity mode. Based on initiation of the activity mode, the processor may adjust parameters of a diabetes treatment plan. The processor may actuate delivery of insulin via a pump mechanism according to the adjusted parameters of the diabetes treatment plan.

BRIEF DESCRIPTION OF THE DRAWINGS

FIG. 6A illustrates an example process implemented when the AP application initiates a hyperglycemia protect mode.

FIG. 6B illustrates an example process implemented when the AP application initiates a hypoglycemia protect mode.

DETAILED DESCRIPTION

This disclosure presents various systems, components, and methods operable to adjust insulin delivery to a user based on an available activity mode of operation of a drug delivery device worn by the user. Each of the systems, components, and methods disclosed herein provides one or more advantages over conventional systems, components, and methods.

An example provides a process that may be used with any additional algorithms or computer applications that manage blood glucose levels and insulin therapy. As discussed herein, the algorithms may be referred to as an "artificial pancreas" algorithm-based system, or more generally, an artificial pancreas (AP) application. An AP application may be programming code stored in a memory device and that is executable by a processor, controller or computer device, such as a smart phone, tablet, personal diabetes management device or the like. Examples of artificial pancreas (AP) application as discussed herein provide automatic delivery of an insulin based on inputs from a blood glucose sensor input, such as that received from a CGM or the like, an inertial measurement unit (IMU), global positioning system devices and the like.

In an example, the artificial pancreas (AP) application when executed by a processor may enable a system to monitor a user's glucose values, determine an appropriate level of insulin for the user based on the monitored glucose values (e.g., blood glucose concentrations or blood glucose measurement values) and other information, such as user-provided information, such as carbohydrate intake, meal times or the like, and take actions to maintain a user's blood glucose value within an appropriate range. The appropriate blood glucose value range may be considered a target blood glucose value of the particular user. For example, a target blood glucose value may be acceptable if it falls within the range of 80 mg/dL to 140 mg/dL, which is a range satisfying the clinical standard of care for treatment of diabetes. However, an AP application as described herein may account for an activity level of a user to more precisely establish a target blood glucose value and may set the target blood glucose value at, for example, 110 mg/dL, or the like. As described in more detail with reference to the examples of FIGS. 1-7, the AP application may utilize the monitored blood glucose values and other information to generate and send a command to a wearable drug delivery device including, for example, a pump, to control delivery of insulin to the user, change the amount or timing of future doses, as well as to control other functions.

Figure 1:
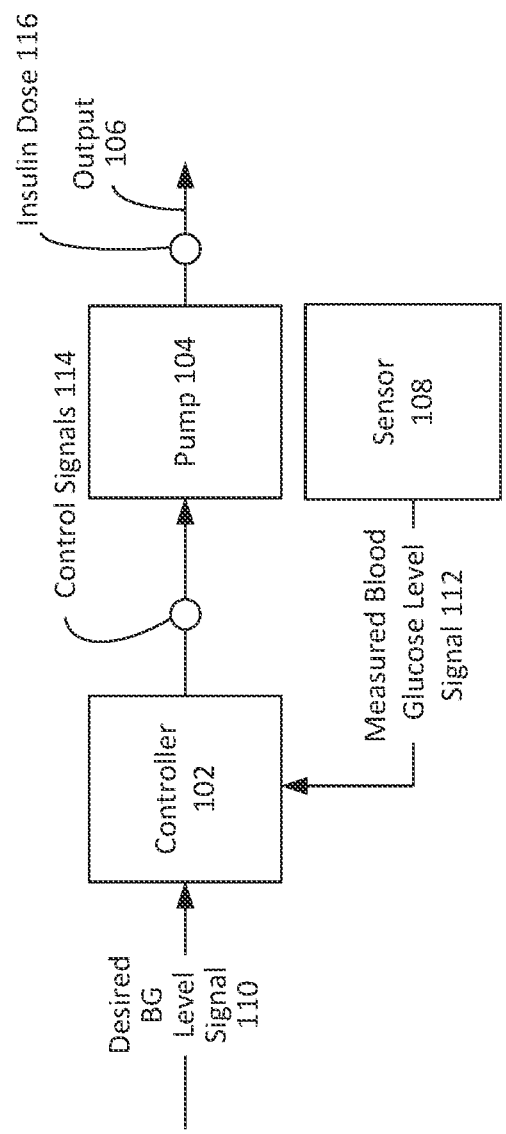
FIG. 1 illustrates an example of artificial pancreas (AP) system operable to implement the insulin delivery adjustments based on the increased activity levels of the user or detected locations of the user as discussed herein.

FIG. 1 illustrates a simplified block diagram of an example of an artificial pancreas (AP) system 100. The example AP system 100 may include a controller 102, a pump mechanism 104 (hereinafter "pump 104"), and a sensor 108. The controller 102, pump 104, and sensor 108 may be communicatively coupled to one another via a wired or wireless communication paths. For example, each of the controller 102, the pump 104 and the sensor 108 may be equipped with a wireless radio frequency transceiver operable to communicate via one or more communication protocols, such as Bluetooth®, or the like. The sensor 108 may be a glucose monitor such as, for example, a continuous glucose monitor (CGM) 108. The CGM 108 may, for example, be operable to measure BG values of a user to generate the measured BG level signal 112.

As shown in the example, the controller 102 may receive a desired blood glucose (BG) level signal 110, which may be a first signal, indicating a desired blood glucose (BG) level or range for a user. The desired BG level signal 110 may be received from a user interface to the controller or other device, or by an algorithm that automatically determines a BG level for a user. The sensor 108 may be coupled to the user and be operable to measure an approximate value of a BG level of the user. The measured BG value, the measured BG level, the measured BG level value, or the approximate measured value of the actual BG level are only approximate values of a user's BG level and it should be understood that there may be errors in the measured BG levels or values. The errors may, for example, be attributable to a number of factors such as age of the sensor 108, location of the sensor 108 on a body of a user, environmental factors (e.g., altitude, humidity, barometric pressure), or the like. The terms measured BG value and approximate measured value of the BG level may be used interchangeably throughout the specification and drawings. In response to the measured BG level or value, the sensor 108 generate a signal indicating the measured BG value. As shown in the example, the controller 102 may also receive from the sensor 108 via a communication path, a measured BG level signal 112, which may be a second signal, indicating an approximate measured value of the measured BG level of the user.

Based on the desired BG level signal 110 and the measured BG level signal 112, the controller 102 may generate one or more control signals 114 for directing operation of the pump 104. For example, one of the control signals 114 may cause the pump 104 to deliver a specified amount of insulin 116 to a user via output 106. The specified amount of insulin 116 may, for example, be determined based on a difference between the desired BG level signal 110 and the actual BG signal level 112. The specified amount of insulin may be determined as an appropriate amount of insulin to drive the measured BG level of the user to the desired BG level. Based on operation of the pump 104 as determined by the control signals 114, the user may receive the insulin 116 from the pump 104.

The AP system 100 may operate as a closed-loop system or may operate as an open-loop system. In various examples, one or more components of the AP system 100 may be incorporated into a wearable or on body drug delivery system that is attached to the user.

The simplified block diagram of the example AP system 100 provides a general illustration of the operation of the system. An example of a more detailed implementation of devices usable in such an AP system is illustrated in FIG. 2.

Various examples of an AP system include a wearable drug delivery device that may operate in the system to manage treatment of a diabetic user according to a diabetes treatment plan. The diabetes treatment plan may include a number of parameters related to the delivery of insulin that may be determined and modified by a computer application referred to as an AP application.

A wearable drug delivery device as described herein may include a controller operable to direct operation of the wearable drug delivery device via the AP application. For example, a controller of the wearable drug delivery device may provide a selectable activity mode of operation for the user. Operation of the drug delivery device in the activity mode of operation may reduce a probability of hypoglycemia during times of increased insulin sensitivity for the user and may reduce a probability of hyperglycemia during times of increased insulin requirements for the user. The activity mode of operation may be activated by the user or may be activated automatically by the controller. The controller may automatically activate the activity mode of operation based on a detected activity level of the user and/or a detected location of the user.

Figure 2:
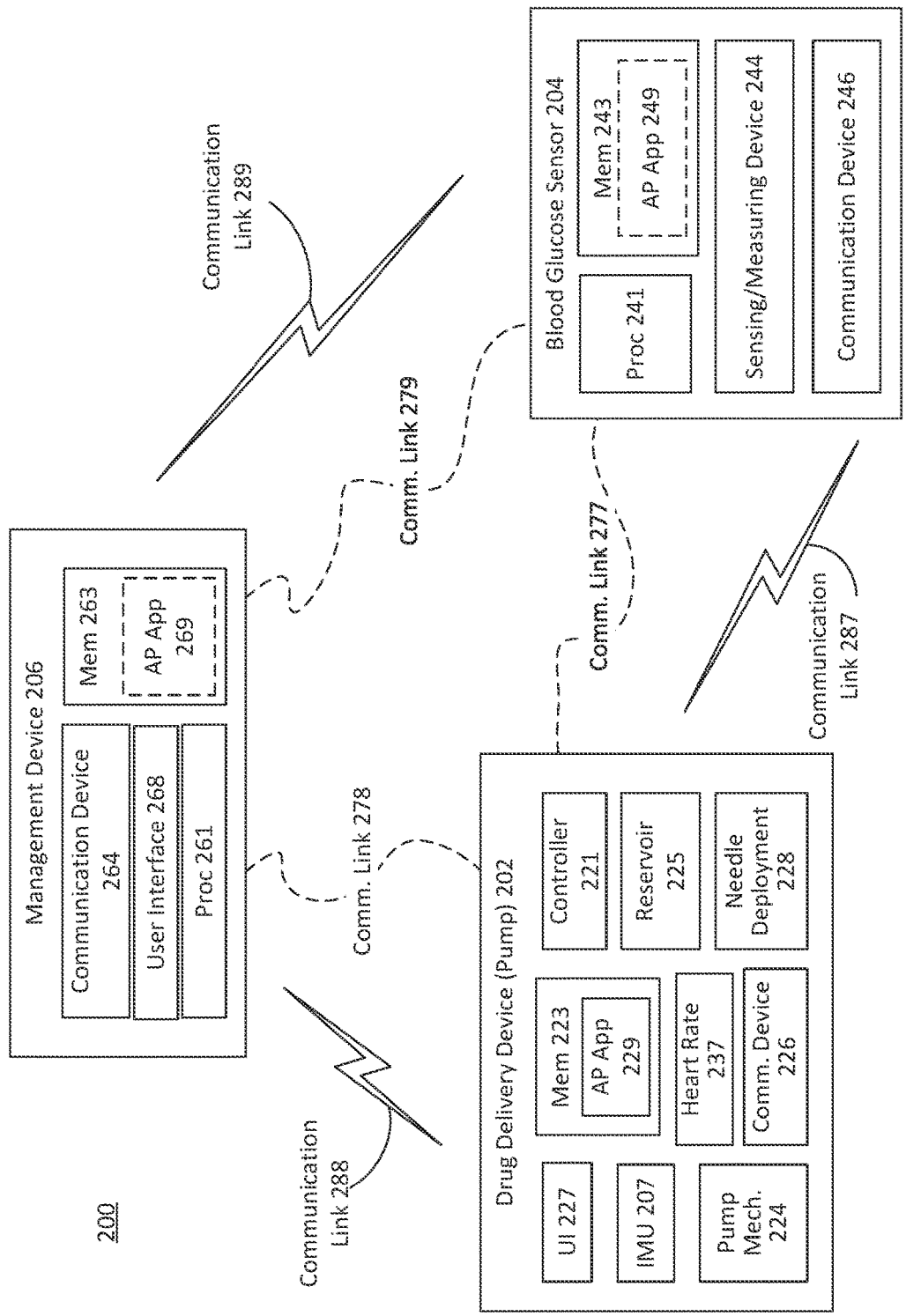
FIG. 2 illustrates an example of inertial measurement unit (IMU) operable to detect the increased activity levels as discussed herein.

FIG. 2 illustrates an example of a drug delivery system. The drug delivery system 200 may include a drug delivery device 202, a management device 206, and a blood glucose sensor 204.

In the example of FIG. 2, the drug delivery device 202 may be a wearable or on-body drug delivery device that is worn by a patient or user on the body of the user. As shown in FIG. 2, the drug delivery device 202 may include an inertial measurement unit (IMU) 207. The drug delivery device 202 may further include a pump mechanism 224 that may, in some examples be referred to as a drug extraction mechanism or component, and a needle deployment component 228. In various examples, the pump mechanism 224 may include a pump or a plunger (not shown).

The needle deployment component 228 may, for example include a needle (not shown), a cannula (not shown), and any other fluid path components for coupling the stored liquid drug in the reservoir 225 to the user. The cannula may form a portion of the fluid path component coupling the user to the reservoir 225. After the needle deployment component 228 has been activated, a fluid path (not shown) to the user is provided, and the pump mechanism 224 may expel the liquid drug from the reservoir 225 to deliver the liquid drug to the user via the fluid path. The fluid path may, for example, include tubing (not shown) coupling the wearable drug delivery device 202 to the user (e.g., tubing coupling the cannula to the reservoir 225).

The wearable drug delivery device 202 may further include a controller 221 and a communications interface device 226. The controller 221 may be implemented in hardware, software, or any combination thereof. The controller 221 may, for example, be a processor, a logic circuit or a microcontroller coupled to a memory. The controller 221 may maintain a date and time as well as other functions (e.g., calculations or the like) performed by processors. The controller 221 may be operable to execute an artificial pancreas algorithm stored in the memory that enables the controller 221 to direct operation of the drug delivery device 202. In addition, the controller 221 may be operable to receive data or information indicative of the activity of the user from the IMU 207, as well as from any other sensors (such as those (e.g., accelerometer, location services application or the like) on the management device 206 or CGM 204) of the drug delivery device 202 or any sensor coupled thereto, such as a global positioning system (GPS)-enabled device or the like.

The controller 221 may process the data from the IMU 207 or any other coupled sensor to determine if an alert or other communication is to be issued to the user and/or a caregiver of the user or if an operational mode of the drug delivery device 202 is to be adjusted. The controller 221 may provide the alert, for example, through the communications interface device 226. The communications interface device 226 may provide a communications link to one or more management devices physically separated from the drug delivery device 202 including, for example, a management device 206 of the user and/or a caregiver of the user (e.g., a parent). The communication link provided by the communications interface device 226 may include any wired or wireless communication link operating according to any known communications protocol or standard, such as Bluetooth or a cellular standard.

The example of FIG. 2 further shows the drug delivery device 202 in relation to a blood glucose sensor 204, which may be, for example, a continuous glucose monitor (CGM). The CGM 204 may be physically separate from the drug delivery device 202 or may be an integrated component thereof. The CGM 204 may provide the controller 221 with data indicative of measured or detected blood glucose (BG) levels of the user.

The management device 206 may be maintained and operated by the user or a caregiver of the user. The management device 206 may control operation of the drug delivery device 202 and/or may be used to review data or other information indicative of an operational status of the drug delivery device 202 or a status of the user. The management device 206 may be used to direct operations of the drug delivery device 202. For example, the management device 206 may be a dedicated personal diabetes management (PDM) device, a smart phone, a tablet computing device, other consumer electronic device including, for example, a desktop, laptop, or tablet, or the like. The management device 206 may include a processor 261 and memory devices 263. The memory devices 262 may store an artificial pancreas application 269 including programming code that may implement the activity mode, the hyperglycemia protection mode, and/or the hypoglycemia protection mode. The management device 206 may receive alerts, notifications, or other communications from the drug delivery device 202 via one or more known wired or wireless communications standard or protocol.

The drug delivery system 200 may be operable to implement an AP application that includes functionality to determine a movement of a wearable drug delivery device that is indicative of physical activity of the user, implement an activity mode, a hyperglycemia mode, a hypoglycemia mode, and other functions, such as control of the wearable drug delivery device. The drug delivery system 200 may be an automated drug delivery system that may include a wearable drug delivery device (pump) 202, a sensor 204, and a personal diabetes management device (PDM) 206.

In an example, the wearable drug delivery device 202 may be attached to the body of a user, such as a patient or diabetic, and may deliver any therapeutic agent, including any drug or medicine, such as insulin or the like, to a user. The wearable drug delivery device 202 may, for example, be a wearable device worn by the user. For example, the wearable drug delivery device 202 may be directly coupled to a user (e.g., directly attached to a body part and/or skin of the user via an adhesive or the like). In an example, a surface of the wearable drug delivery device 202 may include an adhesive to facilitate attachment to a user.

The wearable drug delivery device 202 may frequently be referred to as a pump, or an insulin pump, in reference to the operation of expelling a drug from the reservoir 225 for delivery of the drug to the user.

In an example, the wearable drug delivery device 202 may include a reservoir 225 for storing the drug (such as insulin), a needle or cannula (not shown) for delivering the drug into the body of the user (which may be done subcutaneously, intraperitoneally, or intravenously), and a pump mechanism (mech.) 224, or other drive mechanism, for transferring the drug from the reservoir 225, through a needle or cannula (not shown), and into the user. The reservoir 225 may be configured to store or hold a liquid or fluid, such as insulin, morphine, or another therapeutic drug. The pump mechanism 224 may be fluidly coupled to reservoir 225, and communicatively coupled to the controller 221. The wearable drug delivery device 202 may also include a power source (not shown), such as a battery, a piezoelectric device, or the like, for supplying electrical power to the pump mechanism 224 and/or other components (such as the controller 221, memory 223, and the communication device 226) of the wearable drug delivery device 202. Although also not shown, an electrical power supply for supplying electrical power may similarly be included in each of the sensor 204, the smart accessory device (if present), and the management device (PDM) 206.

In an example, the blood glucose sensor 204 may be a device communicatively coupled to the processor 261 or 221 and may be operable to measure a blood glucose value at a predetermined time interval, such as approximately every 5 minutes, or the like. The blood glucose sensor 204 may provide a number of blood glucose measurement values to the AP applications operating on the respective devices. For example, the blood glucose sensor 204 may be a continuous blood glucose sensor that provides blood glucose measurement values to the AP applications operating on the respective devices periodically, such as approximately every 5, 10, 12 minutes, or the like.

The wearable drug delivery device 202 may also include the IMU 207. The IMU 207 may be operable to detect various motion parameters (e.g., acceleration, deceleration, speed, orientation, such as roll, pitch, yaw, compass direction, or the like) that may be indicative of the activity of the user. For example, the IMU 207 may output signals in response to detecting motion of the wearable drug delivery device 202 that is indicative of a status of any physical condition of the user, such as, for example, a motion or position of the user. Based on the detected activity of the user, the drug delivery device 202 may adjust operation related to drug delivery, for example, by implementing an activity mode as discussed herein.

The wearable drug delivery device 202 may when operating in a normal mode of operation may provide insulin stored in reservoir 225 to the user based on information (e.g., blood glucose measurement values, inputs from an inertial measurement unit, global positioning system-enabled devices, Wi-Fi-enabled devices, or the like) provided by the sensor 204 and/or the management device (PDM) 206.

For example, the wearable drug delivery device 202 may contain analog and/or digital circuitry that may be implemented as a controller 221 (or processor) for controlling the delivery of the drug or therapeutic agent. The circuitry used to implement the controller 221 may include discrete, specialized logic and/or components, an application-specific integrated circuit, a microcontroller or processor that executes software instructions, firmware, programming instructions or programming code (enabling, for example, the artificial pancreas application (AP App) 229 as well as the process examples of FIGS. 5-6B) stored in memory 223, or any combination thereof. For example, the controller 221 may execute a control algorithm, such as an artificial pancreas application 229, and other programming code that may make the controller 221 operable to cause the pump to deliver doses of the drug or therapeutic agent to a user at predetermined intervals or as needed to bring blood glucose measurement values to a target blood glucose value. The size and/or timing of the doses may be programmed, for example, into an artificial pancreas application 229 by the user or by a third party (such as a health care provider, wearable drug delivery device manufacturer, or the like) using a wired or wireless link, such as 220, between the wearable drug delivery device 202 and a management device 206 or other device, such as a computing device at a healthcare provider facility. In an example, the pump or wearable drug delivery device 202 is communicatively coupled to the processor 261 of the management device via the wireless link 220 or via a wireless link, such as 208 from the sensor 204. The pump mechanism 224 of the wearable drug delivery device may be operable to receive an actuation signal from the processor 261, and in response to receiving the actuation signal and expel insulin from the reservoir 225 and the like.

The devices in the system 200, such as management device 206, wearable drug delivery device 202, and sensor 204, may also be operable to perform various functions including controlling the wearable drug delivery device 202. For example, the management device 206 may include a communication device 264, a processor 261, and a management device memory 263. The management device memory 263 may store an instance of the AP application 269 that includes programming code, that when executed by the processor 261 provides the process examples described with reference to the examples of FIGS. 1 and 3-6B. The management device memory 263 may also store programming code for providing the process examples described with reference to the examples of FIGS. 1 and 3-6B.

Although not shown, the system 200 may include a smart accessory device may be, for example, an Apple Watch®, other wearable smart device, including eyeglasses, provided by other manufacturers, a global positioning system-enabled wearable, a wearable fitness device, smart clothing, or the like. Similar to the management device 206, the smart accessory device (not shown) may also be operable to perform various functions including controlling the wearable drug delivery device 202. For example, the smart accessory device may include a communication device, a processor, and a memory. The memory may store an instance of the AP application that includes programming code for providing the process examples described with reference to the examples of FIGS. 1 and 3-6B. The memory may also as store programming code and be operable to store data related to the AP application.

The sensor 204 of system 200 may be a continuous glucose monitor (CGM) as described above, that may include a processor 241, a memory 243, a sensing or measuring device 244, and a communication device 246. The memory 243 may store an instance of an AP application 249 as well as other programming code and be operable to store data related to the AP application 249. The AP application 249 may also include programming code for providing the process examples described with reference to the examples of FIGS. 1 and 3-6B.

Instructions for determining the delivery of the drug or therapeutic agent (e.g., as a bolus dosage) to the user (e.g., the size and/or timing of any doses of the drug or therapeutic agent) may originate locally by the wearable drug delivery device 202 or may originate remotely and be provided to the wearable drug delivery device 202. In an example of a local determination of drug or therapeutic agent delivery, programming instructions, such as an instance of the artificial pancreas application 229, stored in the memory 223 that is coupled to the wearable drug delivery device 202 may be used to make determinations by the wearable drug delivery device 202. In addition, the wearable drug delivery device 202 may be operable to communicate via the communication device 226 and communication link 288 with the wearable drug delivery device 202 and with the blood glucose sensor 204 via the communication device 226 and communication link 289.

Alternatively, the remote instructions may be provided to the wearable drug delivery device 202 over a wired or wireless link by the management device (PDM) 206. The PDM 206 may be equipped with a processor 261 that may execute an instance of the artificial pancreas application 269, if present in the memory 263. The wearable drug delivery device 202 may execute any received instructions (originating internally or from the management device 206) for the delivery of insulin to the user. In this way, the delivery of the insulin to a user may be automated.

In various examples, the wearable drug delivery device 202 may communicate via a wireless communication link 288 with the management device 206. The management device 206 may be an electronic device such as, for example, a smart phone, a tablet, a dedicated diabetes therapy management device, or the like. Alternatively, the management device 206 may be a wearable wireless accessory device, such as a smart watch, or the like. The wireless links 287-289 may be any type of wireless link provided by any known wireless standard. As an example, the wireless links 287-289 may enable communications between the wearable drug delivery device 202, the management device 206 and sensor 204 based on, for example, Bluetooth®, Wi-Fi®, a near-field communication standard, a cellular standard, or any other wireless optical or radio-frequency protocol.

The sensor 204 may also be coupled to the user by, for example, adhesive or the like and may provide information or data on one or more medical conditions and/or physical attributes of the user. The information or data provided by the sensor 204 may be used to adjust drug delivery operations of the wearable drug delivery device 202. For example, the sensor 204 may be a glucose sensor operable to measure blood glucose and output a blood glucose value or data that is representative of a blood glucose value. For example, the sensor 204 may be a glucose monitor that provides periodic blood glucose measurements a continuous glucose monitor (CGM), or another type of device or sensor that provides blood glucose measurements.

The sensor 204 may include a processor 241, a memory 243, a sensing/measuring device 244, and communication device 246. The communication device 246 of sensor 204 may include an electronic transmitter, receiver, and/or transceiver for communicating with the management device 206 over a wireless link 222 or with wearable drug delivery device 202 over the link 208. The sensing/measuring device 244 may include one or more sensing elements, such as a blood glucose measurement element, a heart rate monitor, a blood oxygen sensor element, or the like. The processor 241 may include discrete, specialized logic and/or components, an application-specific integrated circuit, a microcontroller or processor that executes software instructions, firmware, programming instructions stored in memory (such as memory 243), or any combination thereof. For example, the memory 243 may store an instance of an AP application 249 that is executable by the processor 241.

Although the sensor 204 is depicted as separate from the wearable drug delivery device 202, in various examples, the sensor 204 and wearable drug delivery device 202 may be incorporated into the same unit. That is, in one or more examples, the sensor 204 may be a part of the wearable drug delivery device 202 and contained within the same housing of the wearable drug delivery device 202 (e.g., the sensor 204 may be positioned within or embedded within the wearable drug delivery device 202). Glucose monitoring data (e.g., measured blood glucose values) determined by the sensor 204 may be provided to the wearable drug delivery device 202 and/or the management device 206, which may use the measured blood glucose values to determine movement of the wearable drug delivery device indicative of physical activity of the user, an activity mode, a hyperglycemia mode and a hyperglycemia mode.

In an example, the management device 206 may be a personal diabetes manager. The management device 206 may be used to program or adjust operation of the wearable drug delivery device 202 and/or the sensor 204. The management device 206 may be any portable electronic device including, for example, a dedicated controller, such as processor 261, a smartphone, or a tablet. In an example, the management device (PDM) 206 may include a processor 261, a management device memory 263, and a communication device 264. The management device 206 may contain analog and/or digital circuitry that may be implemented as a processor 261 (or controller) for executing processes to manage a user's blood glucose levels and for controlling the delivery of the drug or therapeutic agent to the user. The processor 261 may also be operable to execute programming code stored in the management device memory 263. For example, the management device memory 263 may be operable to store an artificial pancreas application 269 that may be executed by the processor 261. The processor 261 may when executing the artificial pancreas application 269 may be operable to perform various functions, such as those described with respect to the examples in FIGS. 1 and 3-6B. The communication device 264 may be a receiver, a transmitter, or a transceiver that operates according to one or more radio-frequency protocols. For example, the communication device 264 may include a cellular transceiver and a Bluetooth transceiver that enables the management device 206 to communicate with a data network via the cellular transceiver and with the sensor 204 and the wearable drug delivery device 202. The respective transceivers of communication device 264 may be operable to transmit signals containing information useable by or generated by the AP application or the like. The communication devices 226 and 246 of respective wearable drug delivery device 202 and sensor 204, respectively, may also be operable to transmit signals containing information useable by or generated by the AP application or the like.

The wearable drug delivery device 202 may communicate with the sensor 204 over a wireless link 208 and may communicate with the management device 206 over a wireless link 220. The sensor 204 and the management device 206 may communicate over a wireless link 222. The smart accessory device, when present, may communicate with the wearable drug delivery device 202, the sensor 204 and the management device 206 over wireless links 287, 288 and 289, respectively. The wireless links 287, 288 and 289 may be any type of wireless link operating using known wireless standards or proprietary standards. As an example, the wireless links 287, 288 and 289 may provide communication links based on Bluetooth®, Wi-Fi, a near-field communication standard, a cellular standard, or any other wireless protocol via the respective communication devices 226, 246 and 264. In some examples, the wearable drug delivery device 202 and/or the management device 206 may include a user interface 227 and 268, respectively, such as a keypad, a touchscreen display, levers, buttons, a microphone, a speaker, a display, or the like, that is operable to allow a user to enter information and allow the management device to output information for presentation to the user.

In various examples, the drug delivery system 200 may be an insulin drug delivery system. For example, the wearable drug delivery device 202 may be the OmniPod® (Insulet Corporation, Billerica, MA) insulin delivery device as described in U.S. Pat. Nos. 7,303,549, 7,137,964, or U.S. Pat. No. 6,740,059, each of which is incorporated herein by reference in its entirety.

In the examples, the drug delivery system 200 may implement the artificial pancreas (AP) algorithm (and/or provide AP functionality) to govern or control automated delivery of insulin to a user (e.g., to maintain euglycemia-a normal level of glucose in the blood). The AP application may be implemented by the wearable drug delivery device 202 and/or the sensor 204. The AP application may be used to determine the times and dosages of insulin delivery. In various examples, the AP application may determine the times and dosages for delivery based on information known about the user, such as the user's sex, age, weight, or height, and/or on information gathered about a physical attribute or condition of the user (e.g., from the sensor 204). For example, the AP application may determine an appropriate delivery of insulin based on glucose level monitoring of the user through the sensor 204. The AP application may also allow the user to adjust insulin delivery. For example, the AP application may allow a user to select (e.g., via an input) commands for output to the wearable drug delivery device 202, such as a command to set a mode of the wearable drug delivery device, such as an activity mode, a hyperglycemia protect mode, a hypoglycemia protect mode, deliver an insulin bolus, or the like. In one or more examples, different functions of the AP application may be distributed among two or more of the management device 206, the wearable drug delivery device (pump) 202 or the sensor 204. In other examples, the different functions of the AP application may be performed by one device, such the management device 206, the wearable drug delivery device (pump) 202 or the sensor 204. In various examples, the drug delivery system 200 may include features of or may operate according to functionalities of a drug delivery system as described in U.S.

patent application Ser. No. 15/359,187, filed Nov. 22, 2016 and Ser. No. 16/570,125, filed Sep. 13, 2019, which are both incorporated herein by reference in their entirety.

As described herein, the drug delivery system 200 or any component thereof, such as the wearable drug delivery device may be considered to provide AP functionality or to implement an AP application. Accordingly, references to the AP application (e.g., functionality, operations, or capabilities thereof) are made for convenience and may refer to and/or include operations and/or functionalities of the drug delivery system 200 or any constituent component thereof (e.g., the wearable drug delivery device 202 and/or the management device 206). The drug delivery system 200—for example, as an insulin delivery system implementing an AP application—may be considered to be a drug delivery system or an AP application-based delivery system that uses sensor inputs (e.g., data collected by the sensor 204).

In an example, the drug delivery device 202 includes a communication device 264, which as described above may be a receiver, a transmitter, or a transceiver that operates according to one or more radio-frequency protocols, such as Bluetooth, Wi-Fi, a near-field communication standard, a cellular standard, that may enable the respective device to communicate with the cloud-based services 211. For example, outputs from the sensor 204 or the wearable drug delivery device (pump) 202 may be transmitted to the cloud-based services 211 for storage or processing via the transceivers of communication device 264. Similarly, wearable drug delivery device 202, management device 206 and sensor 204 may be operable to communicate with the cloud-based services 211 via the communication link 288.

In an example, the respective receiver or transceiver of each respective device 202, 206 or 207 may be operable to receive signals containing respective blood glucose measurement values of the number of blood glucose measurement values that may be transmitted by the sensor 204. The respective processor of each respective device 202, 206 or 207 may be operable to store each of the respective blood glucose measurement values in a respective memory, such as 223, 263 or 273. The respective blood glucose measurement values may be stored as data related to the artificial pancreas algorithm, such as 229, 249, or 269. In a further example, the AP application operating on the management device 206 or sensor 204 may be operable to transmit, via a transceiver implemented by a respective communication device, 264, 274, 246, a control signal for receipt by a wearable drug delivery device. In the example, the control signal may indicate an amount of insulin to be expelled by the wearable drug delivery device 202.

In an example, one or more of the devices 202, 204, or 206 may be operable to communicate via a wired communication links 277, 278 and 279, respectively. The cloud-based services (not shown) may utilize servers and data storage (not shown). A communication link that couples the drug delivery system 200 to the cloud-based services may be a cellular link, a Wi-Fi link, a Bluetooth link, or a combination thereof, that is established between the respective devices 202, 204, or 206 of system 200. For example, the data storage (not shown) provided by the cloud-based services may store anonymized data, such as user weight, blood glucose measurements, age, meal carbohydrate information, or the like. In addition, the cloud-based services 211 may process the anonymized data from multiple users to provide generalized information related to the various parameters used by the AP application. For example, an age-based general target blood glucose value related to activity levels or particular exercises or sports may be derived from the anonymized data, which may be helpful when a user selects an activity mode (or a hyperglycemia protect mode, or a hypoglycemia protect modes) or the system 200 automatically implements the activity mode (or the hyperglycemia protect, or the hypoglycemia protect modes). The cloud-based services may also provide processing services for the system 200, such as performing a process described with reference to later examples.

The wearable drug delivery device 202 may also include a user interface 227. The user interface 227 may include any mechanism for the user to input data to the drug delivery device 202, such as, for example, a button, a knob, a switch, a touch-screen display, or any other user interaction component. The user interface 227 may include any mechanism for the drug delivery device 202 to relay data to the user and may include, for example, a display, a touch-screen display, or any means for providing a visual, audible, or tactile (e.g., vibrational) output (e.g., as an alert). The user interface 227 may also include a number of additional components not specifically shown in FIG. 2 for sake brevity and explanation. For example, the user interface 227 may include a one or more user input or output components for receiving inputs from or providing outputs to a user or a caregiver (e.g., a parent or nurse), a display that outputs a visible alert, a speaker that outputs an audible, or a vibration device that outputs tactile indicators to alert a user or a caregiver of a potential activity mode, a power supply (e.g., a battery), and the like. Inputs to the user interface 227 may, for example, be a via a fingerprint sensor, a tactile input sensor, a button, a touch screen display, a switch, or the like. In yet another alternative, the activity mode of operation may be requested through a management device 206 that is communicatively coupled to a controller 221 of the wearable drug delivery device 202. In general, a user may generate instructions that may be stored as user preferences in a memory, such as 223 or 263 that specify when the system 200 is to enter the activity mode of operation.

Various operational scenarios and examples of processes performed by the system 200 are described herein. For example, the system 200 may be operable to implement process examples related to an activity mode including a hyperglycemia protect mode and a hypoglycemia protect mode as described in more detail below.

In an example, the drug delivery device 202 may operate as an artificial pancreas (AP) system (e.g., as a portion of the AP system 100) and/or may implement techniques or an algorithm via an AP application that controls and provides functionality related to substantially all aspects of an AP system or at least portions thereof. Accordingly, references herein to an AP system or AP algorithm may refer to techniques or algorithms implemented by an AP application executing on the drug delivery device 202 to provide the features and functionality of an AP system. The drug delivery device 202 may operate in an open-loop or closed-loop manner for providing a user with insulin.

Additional features may be implemented as part of the AP application such as the activity mode, the hyperglycemia mode, the hypoglycemia mode, or the like. For example, the drug delivery device 202 when programming code is executed that enables the activity mode, hyperglycemia mode, hypoglycemia mode or the like of the AP application. As the AP application including the programming code for the activity mode, the hyperglycemia mode, and the hypoglycemia mode is executed, the AP application may adjust operations, such as detecting motion or movement of the wearable drug delivery device that is indicative of physical activity of the user. For example, motion and movement of the wearable drug delivery device 202 that induces motions characteristic of physical activity of the user (e.g., movements, such as jumping, dancing, running, weightlifting, cycling or the like) may be detected by the IMU 207. In addition, the IMU 207, as described in more detail with reference to FIG. 3, may include a global positioning system that may detect a location of the wearable drug delivery device 202. Alternatively, or in addition, the wearable drug delivery device 202 may also obtain location information by utilizing Wi-Fi location services obtained via communication device 226 enabling the controller 221 to determine the location of the wearable drug delivery device 202.

In an example, the AP algorithm may learn from repeated interaction with the user who may input an indication at particular times that they are about to perform physical activity. Alternatively, or in addition, the wearable drug delivery device 202 may upon detection of a particular location (e.g., gym, sports field, stadium, track, or the like) determine that the user is about to increase their physical activity. In an operational example, the controller 221 may be operable to receive a location associated with the wearable drug delivery device 202 from the IMU 207 or Wi-Fi location services provided via the communication device 226. The controller may obtain locations of physical activity from the memory 223 and be operable to compare the received location to locations of physical activity obtained from the memory. The controller 221, based on a result of the comparison indicating that the location associated with the wearable drug delivery device is substantially the same as a location in the locations of physical activity obtained from the memory, may indicate that an activity mode threshold has been exceed. In which case, if not having already done so, the controller 221 may initiate an activity mode or a hypoglycemia protect mode.

Figure 3:
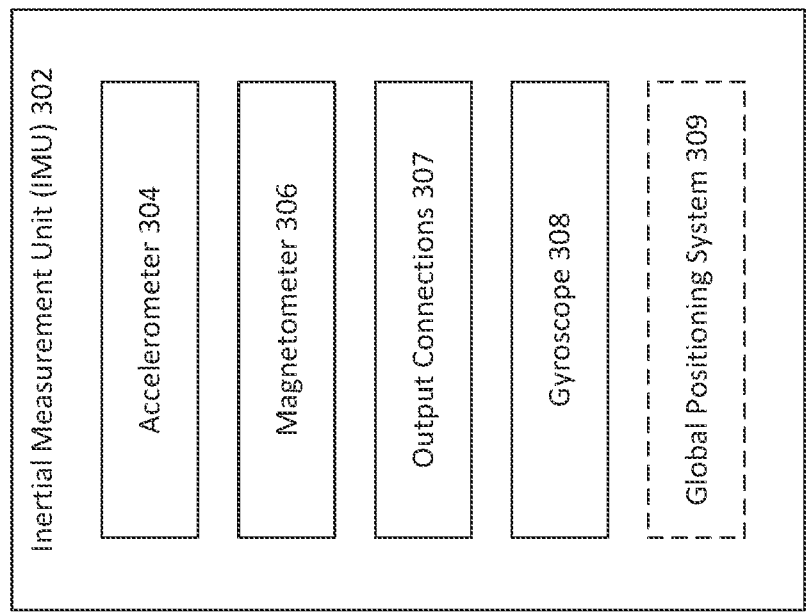
FIG. 3 illustrates an example of drug delivery device operable to implement the techniques and processes described herein.

It may be helpful to describe the number of components included in the IMU 207 that provide motion and movement measurement data or values to the controller 221. An example of an inertial measurement unit (IMU) is shown in FIG. 3. The IMU 302 may include an accelerometer 304, a magnetometer 306, output connections 307, and a gyroscope 308. The IMU 302 may optionally include a global positioning system component 309.

The output connections 307 enable the IMU 302 to be coupled other components of a wearable drug delivery device, such as 202 of FIG. 2. The IMU 302 may combine the features and capabilities of the accelerometer 304, the magnetometer 306, and the gyroscope 308 for detecting various operational parameters of the wearable drug delivery device. In various examples, the IMU 302 may be integrated into a drug delivery device or system such as, for example, a wearable or on-body drug delivery device. In various examples, the IMU 302 may be used for detecting various parameters related to activity of a user and for enabling the activity mode (and/or the hyperglycemia mode or the hypoglycemia mode) disclosed herein. In various examples, the device or system in which the IMU 302 is integrated may also dynamically adapt activity mode parameters based on the user's response to an activity. The activity, for example, may be a user indicated activity or may be an activity detected based on a level of activity measured by, for example, the accelerometer 304, the magnetometer 306, or the gyroscope 308.

For example, the accelerometer 304 may generate one or more signals indicative of, for example, a detected or measured acceleration force. The magnetometer 306 may generate one or more signals indicative of, for example, a detected or measured magnetic field. The gyroscope 308 may generate one or more signals indicative of, for example, an orientation of the gyroscope 308 or the IMU 302, or a device in which either component is integrated. The signals generated by the accelerometer 304, the magnetometer 306, and the gyroscope 308 may be provided to other components and devices (e.g., the processor or controller 221 of FIG. 2) and/or may be stored (e.g., within a non-transitory computer readable memory). In various examples, the IMU 302 may detect a motion, a movement, or a position of a device in which it is incorporated (or of a user wearing the device in which the IMU 302 is integrated).

The IMU 302 may also be equipped with a global positioning system (GPS) component 309 that receives signals from which a location of the IMU 302 may be determined. The determined location may be provided to the controller 221 of the wearable drug delivery device 202 via a communication link 277 or 287 as well as to the processor 261 of the management device 206. In addition, the blood glucose sensor 204, if executing an instance of the AP application, such as 249, may also receive a signal from the GPS 309.

Figure 4:
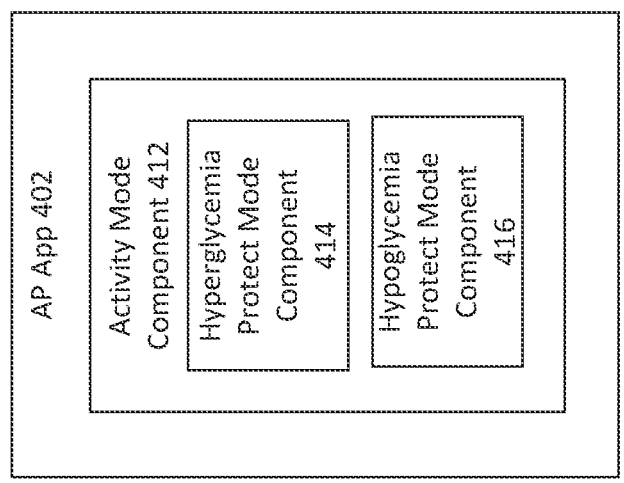
FIG. 4 illustrates an example of components of the AP application with respect to examples related to an activity mode, a hyperglycemia protect mode, and a hypoglycemia protect mode.

FIG. 4 illustrates an example of components of the AP application. The AP application 402 may be non-transitory computer-readable programming code stored in the memory of a device such as management device 206, wearable drug delivery device 202 or blood glucose sensor 204. Each of the management device 206, the wearable drug delivery device 202, or the blood glucose sensor 204 may execute their individual instances of the AP application 402 (as shown in and discussed with reference to the example of FIG. 2). The AP application 402 may provide functions, such as managing the daily delivery of insulin to a user as described with reference to the examples of FIGS. 1 and 2. Additional examples of functions provided by the AP application 402 are described in U.S. patent application Ser. No. 15/359,187, filed Nov. 22, 2016 and Ser. No. 16/570,125, filed Sep. 13, 2019, which are both incorporated herein by reference in their entirety.

The activity mode component 412 may be additional programming code that may be a plug-in to the AP application 402. The activity mode component 412 may provide functions related to activity mode, such as those mentioned above, that responds to the detection of movement related to physical activity of a user wearing a wearable drug delivery device, such as 202 of FIG. 2. Within the activity mode component 412 may be additional components, such as a hyperglycemia protect mode component 414 and a hypoglycemia protect mode component 416.

The hyperglycemia protect mode component 414 may provide additional functions, constraints and limits to the insulin dosages provided while the activity mode is initiated to protect a user from having blood glucose measurements that exceed clinically acceptable blood glucose levels (e.g., greater than or approximately equal to 180 mg/dL). Conversely, the hypoglycemia protect mode component 416 may provide additional functions, constraints and limits to the insulin dosages provided while the activity mode is initiated to protect a user from having blood glucose measurements that fall below clinically acceptable blood glucose levels (e.g., less than or approximately equal to 70 mg/dL).

In an example, operation of the AP application may be operable to receive inputs from a user, a blood glucose sensor, such as 204 of FIG. 2 or 108 of FIG. 1, other devices, such as a management device 206 or wearable drug delivery device, or obtain data from a memory, such as 223 or the 263. In response to receiving inputs from the IMU 207, the AP application 402 may respond to the inputs by initiating the functions of the activity mode component 412. For The activity mode component 412 may provide additional inputs, add weightings to parameters (e.g., weightings to the calculation of total daily insulin (TDI), the basal dosages of a user, bolus dosages, or the like) used in the calculations of the doses of insulin to be delivered to the user. The determined location by the GPS 309 may be flagged by a user as a location at which physical activity takes place, such as a gym, a sports field, or the like.

While the foregoing examples described the hardware and software components that may be used to provide an AP application 402 augmented with functionality provided by an activity mode, a hyperglycemia protect mode and a hypoglycemia protect mode, each of the respective modes of operation may present different processes to provide the respective functionality.

Figure 5:
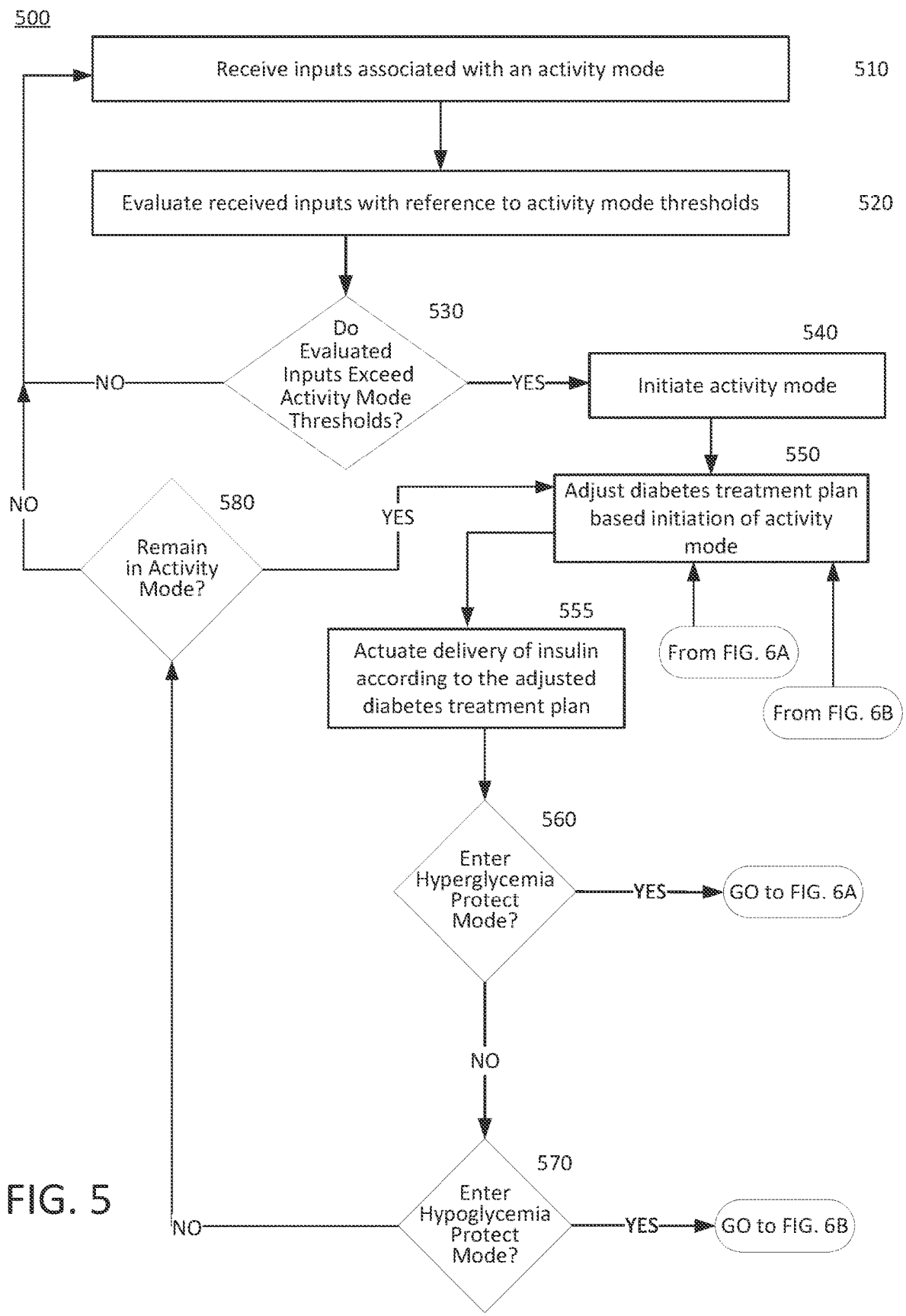
FIG. 5 illustrates an example process of the activity mode.

The AP application 402 of FIG. 4 may operate in an activity mode to reduce a likelihood of an occurrence of hypoglycemia and hyperglycemia. FIG. 5 illustrates an example process of the activity mode. The example process of FIG. 5 is described below with reference to the system example of FIG. 2.

As disclosed herein, when the drug delivery device 202 in the example of FIG. 2 may operate as a closed loop system under control of the AP application. In an example, a close loop system may use a continuous glucose monitor to provide blood glucose measurements and use of the AP application to determine insulin dosing requirements and automated delivery as shown in the example of FIG. 2) As a result, much of the burden is removed from the user to keep insulin levels of the user within a range appropriate for the particular user given, for example, the user's insulin on board, insulin sensitivity, or the like. The closed loop operation may be provided in part by monitoring blood glucose (BG) levels of the user occasionally (e.g., periodically) to determine an amount of insulin to deliver to the user, without user intervention. By closely monitoring BG levels, large and/or frequent fluctuations in BG levels of the user may be avoided. However, even during this closed loop operation by a drug delivery device, such as 202, additional monitoring as provided by the activity mode plug-in may ensure BG levels do not fall below certain safe levels, especially when a user is engaged in physical activity, such as exercising, participating in sports, dancing and the like.

For example, the activity mode disclosed herein may be used for reducing the probability of hypoglycemia due to increased insulin sensitivity. In an example, the activity mode disclosed herein may be used to manage general increases of average blood glucose to prevent hypoglycemia during times of high glucose variability. In addition, the activity mode may reduce the probability of hyperglycemia due to increased insulin requirements. The activity mode may also be used to reduce alarm requirements (cause alarms to occur earlier or later) to prevent excessive periods of high glucose concentrations during times of increased insulin resistance by informing the user initiating changes in manual or automatic insulin delivery. In an example, multiple settings of the activity mode (or any additional or sub-mode thereof) may be available to set operation to different degrees of conservativeness or aggressiveness.

In closed loop operation, the AP application may manage a user's diabetes treatment plan using various parameters and functions, such as cost functions and the like, as discussed in described in U.S. patent application Ser. No. 15/359,187, filed Nov. 22, 2016 and Ser. No. 16/570,125, filed Sep. 13, 2019, which are both incorporated herein by reference in their entirety. As an example, a conservative mode of operation may include use of a setpoint equal to approximately 120 to 150 mg/dL, setting a maximum insulin delivery equal to approximately 1 to 3 times the user's basal rate, and setting the input basal to the AP algorithm equal to approximately 50% to 90% of the user's entered basal rate. Alternatively, an aggressive mode of operation may include use of a setpoint equal to approximately 100 to 120 mg/dL, setting a maximum insulin delivery to at most approximately 3 to 6 times the user's basal over approximately 3 to 6 hours, and reducing the hyperglycemia alarm threshold(s) to triggering alarms for any glucose values above approximately 250 to 350 mg/dL for more than approximately 15 minutes to 60 minutes.

In the process 500, the AP application may use settings similar to the above insulin delivery parameters and alarm thresholds as a baseline during daily management of a user's diabetes treatment plan (i.e., without the initiation of activity mode). While the AP application is executing by a processor or controller, such as 221, the AP application may receive inputs associated with the activity mode at 510. The inputs may be received from several different sources including from the controller 221. For example, the AP application executing on the drug delivery device 202 may monitor inputs from the IMU 207, the heart rate monitor 237, and the user interface 227 for signals or indications associated to activity mode. The outputs from the IMU 207 and/or the heart rate monitor 237 may include timestamps so the controller 221 may determine a duration of the physical activity indicated by the received inputs.

Alternatively, at 510, the drug delivery device 202 may, for example, receive via the user interface 227 a selection specifying activation of the activity mode of operation via the user interface 227. Alternatively, the AP application executing on the wearable drug delivery device may determine the occurrence of increased physical activity based on signals indicating, for example, increased heart rate or pulse rate received from the heart rate monitor 237, movement indicators from the IMU 207, or a combination of both.

Based on the signals received from the IMU, heart rate monitor 237 and the user interface, the AP application may evaluate the received inputs to determine whether to initiate the activity mode at 520. In various examples, the evaluation of the received inputs, at 520, may include an evaluation of default values for duration and an intensity level of the physical activity indicated by the received inputs. For example, the AP application may receive an indication of a heart rate over a predetermined threshold, e.g., 50-70 percent of the maximum age-appropriate heart rate or the like, an accelerometer reading indicating motion exceeding a walking pace, gyroscopic readings indicating motion in up/down and lateral directions, or the like for a period of time that exceeds an activity duration threshold. Alternatively, or in addition, the user may specify an amount of time and/or a different activity intensity level when the activity mode of operation is entered manually. For example, the duration of the activity mode of operation may be a timed session (e.g., 1 hour, 2 hours, a common duration of a sports event (e.g., 2.5 hours for a baseball game, or the like) or may be turned off manually by a user or caregiver.

For example, the AP application may evaluate the received inputs against activity mode thresholds stored in a memory, such as 223. The activity mode thresholds may be based on user history accumulated over days, months or years, user preference settings, or as a default, clinical information based on the user's age, weight, height and the like. In another example, the evaluation at 520 may include comparing the monitored indicators to activity mode thresholds set by the user. In various examples, the AP application may automatically initiate the activity mode of operation based on activity of the user detected by the IMU 207.

In an example, the controller 221 may retrieve the activity mode thresholds from a memory, such as 223. The controller 221 may determine a duration of an indication of physical activity. The controller 221 may compare the determined duration of the indication of physical activity to a default duration value from among the retrieved activity mode thresholds. Based on a result of the comparison, the controller 221 may indicate that the duration of the indication of physical activity exceeds an activity mode threshold for duration of physical activity. In response to the indication that the duration of the indication of physical activity exceeds an activity mode threshold for duration of physical activity, output an instruction to initiate activity mode. Alternatively, the activity mode thresholds may be set by a user, who may use default or user specified presets that assign a set of operational parameters that may be varied for an activity.

In another example, the AP application may monitor and access a data storage (e.g., a memory), which may contain a spreadsheet, a calendar, or the like, for scheduling information related to events or physical activity input by a user as either additional received inputs or as the sole received inputs at 510. The scheduling information may include a schedule of physical activity or events in which the user participates or that may affect diabetes management, such as airplane travel, conferences, holidays, or the like that the user is participating in during a period of time (e.g., a day, hour, month, week, or year). The scheduling information may include physical fitness (i.e., exercise) classes, sports events, marathon schedules, travel arrangements, conference dates (and agenda), and the like. The AP application may be operable to access (according to user permissions) the schedule and evaluate scheduled events (e.g., travel, conferences, birthdays) or scheduled physical activity.

After accessing the scheduling information stored in the data storage, the evaluation of the scheduled events or scheduled physical activity by the AP application at 520 may include comparing dates and times with a current time and date maintained by the controller 221. Based on the results of the comparison, identify an event and a scheduled physical activity that a user is participating. The controller 221 executing the AP application may generate an alert, either via the user interface 227 or cause a signal to be transmitted to the management device 206, for presentation of a prompt requesting confirmation of initiation of the activity mode.

The AP application may at 530 determine whether the inputs evaluated at 520 exceed any activity mode thresholds. If the determination is NO, the process 500 may return to 500 and continue. Alternatively, should the AP application determine that YES, the evaluated inputs exceed the activity mode thresholds, the process 500 may proceed with the AP application initiating the activity mode at 540.

In yet another example, the user may also schedule via the user interface 227 activation of the activity mode of operation for a certain future day or time in which case the evaluation at 520 may be whether the physical activity was scheduled in which case the result of the evaluation is that the activity mode threshold is exceeded.

In response to the initiation of the activity mode at 540, the process 500 at step 550 may modify or adjust the diabetes treatment plan. For example, the AP algorithm executing on the drug delivery device 202 may recommend administering or may automatically administer a correction bolus prior to the expected increased period of insulin requirements based on, for example, a scheduled time of event, a determined glucose value, a determined lack of insulin on board, or any combination thereof.

For example, the AP application executed by the controller 221 may adapt or modify and adjust the parameters of a diabetes treatment plan according to the adjusted or modified parameters as the activity mode of operation is implemented multiple times over a period of time based on actual learned patient response to any parameter associated with a particular activity mode of operation. For example, the AP application, while in the activity mode, may continue to receive inputs related to the user's diabetes treatment plan. For example, the received inputs may include determined glucose values, determined glucose rates or change, motion or activity detected by components (shown and described with reference to the example of FIG. 3) of the IMU 207, and/or inputs from other sensors integrated within or otherwise coupled to the drug delivery device 202. The AP application may continue to evaluate and process the received inputs utilizing AP application algorithms and functions adjusted based on the activity mode, but also the daily operation of the AP application. The AP application may use the received inputs to determine whether there is a need to adjust diabetes treatment plan parameters (e.g., an amount of bolus dosage, a calculation of insulin on board, total daily insulin, timing of insulin delivery, or the like) over time. The AP application in response to the adjusted parameters of the diabetes treatment plan may modify an amount of insulin to be delivered by the pump mechanism 224.

At 555, the AP application may, in response to the adjusted parameters of the diabetes treatment plan, cause the controller 221 to actuate the pump mechanism 224 to deliver insulin according to the adjusted diabetes treatment plan (which was adjusted in 550).

In an example, when the AP application utilizes the scheduled events or physical activity to initiate the activity mode, the AP application may look at scheduled events or physical activity that are scheduled in the future (e.g., several hours or the like in the future). In response to evaluating the future scheduled events or physical activity, the AP application may, prior to the occurrence of the scheduled activity or event, initiate activity mode in advance and begin adjusting the diabetes treatment plan. For example, the AP application may determine that the amount of insulin on board (e.g., prior to exercise scheduled for the user) is to be reduced to meet limits established for the user. In a specific example, when an activity may be scheduled to begin, for example, at 10:00 am, the drug delivery device 202 may start the activity mode of operation at, for example, 8:30 am to allow time for the user's blood glucose to elevate and to reduce an amount of insulin on board (i.e., within the body of the user). By starting the activity mode in advance of the scheduled event or physical activity, the AP application may either suspend delivery of insulin or reduce an amount of insulin scheduled to be delivered to allow the amount of insulin on board to diminish and the measured blood glucose value to increase. Alternatively, the scheduled event may be an event for which the increase in insulin resistance is expected. As a result, the AP application executing on the drug delivery device 202 may initiate the activity mode of operation prior to an expected increase in insulin resistance in order to adjust the diabetes treatment plan of the user to increase the amount of insulin on board prior to the event for which the increase in insulin resistance is expected. The foregoing adjustments to the diabetes treatment plan may be in response to monitoring the scheduled events.

The techniques or processes 500 implemented by the AP application related to the activity mode may also implement a hyperglycemia protect mode and a hypoglycemia protect mode. For example, an activity mode may be operable through the hypoglycemia protect mode to reduce the potential for an occurrence of hypoglycemia during periods of increased insulin sensitivity such as, for example, during exercise or other moderate-to-intense physical activity. In addition, the activity mode may, for example, be operable to reduce a likelihood of an occurrence of hyperglycemia during times of increased insulin requirements, such as, for example, when the user is suffering from an illness (stress), is on a long plane flight (environmental conditions associated with air travel such as reduced air pressure that affects glucose monitoring, reduced ability to control diet, and the like), or the like. As an example, a conservative mode of operation may include use of a setpoint equal to approximately 120 to 150 mg/dL, setting a maximum insulin delivery equal to approximately 1 to 3 times the user's basal rate, and setting the input basal to the AP algorithm equal to approximately 50% to 90% of the user's entered basal rate. Alternatively, an aggressive mode of operation may include use of a setpoint equal to approximately 100 to 120 mg/dL, setting a maximum insulin delivery to at most approximately 3 to 6 times the user's basal over approximately 3 to 6 hours, and reducing the hyperglycemia alarm threshold(s) to triggering alarms for any glucose values above approximately 250 to 350 mg/dL for more than approximately 30 minutes.

The activity mode of operation may include or may separately specify a hypoglycemia mode of operation and/or a hyperglycemia mode of operation. When operating in the activity mode, the AP algorithm may also implement the hypoglycemia protection mode of operation and the hyperglycemia protection mode of operation.

At 560, the AP application may process blood glucose measurements received from the blood glucose sensor 204 over time, amounts of insulin delivered over time according to the diabetes treatment plan of the user, and calculate and analyze trends determined related to insulin delivery and the blood glucose measurements. Based on the processing, the AP application may evaluate whether a hyperglycemia protect mode is to be entered, such as if the AP application determines a persistently elevated raw glucose concentration or trend during increasing insulin delivery, or unchanging raw glucose concentration or trend during reduced insulin delivery, or elevated raw glucose value or trend over significant periods of time regardless of insulin delivery, or the like. For example, the AP application may enter hyperglycemia mode in cases where persistently high glucose values are detected even if a significant amount of insulin has been delivered. Based on the result of the evaluation, the AP application may determine that YES, a hyperglycemia protect mode is to be entered and the process 500 proceeds as a precautionary measure to the process shown in FIG. 6A. In an example, the AP application may determine to enter the hyperglycemia protect mode based on an input received from a calendar or user input. For example, the user may be scheduled for 10:00 am airline flight, in such as case, the drug delivery device 202 may initiate the activity mode of operation at 8:00 am to reduce the user's glucose and to increase the amount of insulin on board and in preparation for entering (i.e., the determination at 560 is YES) the hyperglycemia protect mode.

In an operational example, the controller 221 (or a processor) may be operable to receive blood glucose measurements from the blood glucose sensor 204. The controller 221 (or processor) may process the blood glucose measurements. The processing may reveal the blood glucose measurements are increasing toward exceeding a maximum blood glucose set point. The maximum blood glucose set point may be a blood glucose value that the AP application (or the user manually) sets as a maximum upper limit of a blood glucose value for the user. Based on an indication that the blood glucose measurements are increasing toward exceeding the maximum blood glucose set point, the controller may enter the hyperglycemia protect mode. Alternatively, or in addition, the AP application executing on the controller may generate an alarm signal indicating that the blood glucose measurements are increasing toward exceeding the maximum blood glucose set point to enable the user to take remedial action.

Conversely, if the AP application determines, at 560, NO, the hyperglycemia protect mode does not need to be entered and the process 500 proceeds to 570.

At 570, the AP application may process blood glucose measurements received from the blood glucose sensor 204 over time, amounts of insulin delivered over time according to the diabetes treatment plan of the user, and trends determined related to insulin delivery and the blood glucose measurements. Based on the processing, the AP application may evaluate whether a hypoglycemia protect mode is to be entered, such as if the AP application determines a persistently reduced raw glucose concentration or trend during decreasing insulin delivery, or unchanging raw glucose concentration or trend during increased insulin delivery or reduced raw glucose value or trend over significant periods of time regardless of insulin delivery, or the like. For example, the AP application may determine to enter hypoglycemia protect mode if the measured blood glucose value continues to drop despite reduced insulin delivery or suspension. Based on the result of the evaluation, the AP application may determine that YES, a hypoglycemia protect mode is to be entered and the process 500 proceeds as a precautionary measure to the process shown in FIG. 6B.

In an operational example, the controller 221 (or a processor) may be operable to receive blood glucose measurements from the blood glucose sensor 204. The controller 221 (or processor) may process the blood glucose measurements. The processing may reveal the blood glucose measurements are decreasing toward a minimum blood glucose set point. The minimum blood glucose set point may be a blood glucose value that the AP application (or the user manually) sets as a minimum lower limit of a blood glucose value for the user. Based on an indication that the blood glucose measurements are decreasing toward falling below the minimum blood glucose set point, the controller may enter the hypoglycemia protect mode. Alternatively, or in addition, the AP application executing on the controller may generate an alarm signal indicating that the blood glucose measurements are decreasing toward falling below the minimum blood glucose set point to enable the user to take remedial action.

Conversely, if the AP application determines NO, the hypoglycemia protect mode does not need to be entered and the process 500 proceeds to 580.

The hypoglycemia and hyperglycemia protection modes may either, in a first scenario, be modes of operation that are distinct from one another, (i.e., that are separately selectable or automatically entered into) or, in a second scenario, may be sub-modes of operation under the activity mode of operation and may be entered into automatically during execution of the activity mode of operation. Under either scenario, the techniques and devices disclosed herein enable operation according to these modes (e.g., activity mode, hypoglycemia protection mode or hyperglycemia protection mode) of operation to provide the protection and risk management benefits and advantages of an AP application enabled with these additional modes of operation as disclosed herein.

At 580, the AP application determines whether to remain in activity mode. For example, if the user set duration for activity mode has not expired the AP application may continue operating in activity mode. Alternatively, the received inputs from the IMU 207 or heart rate monitor 237 may continue to indicate physical activity. As a result of either the set duration not expiring or the continued indication of physical activity, the determination at 580 may be YES and the process 500 returns to 550 for adjustment of the diabetes treatment plan. Note that the adjustment of the diabetes treatment plan may be on-going as updated blood glucose measurements continue to be received by the AP application and are evaluated. Alternatively, the determination at 580 may be NO, do not remain in activity mode in which case the process 500 returns to 510 to receive inputs associated with the activity mode to determine if the user will be participating in other physical activity.

The increased activity may be detected using indicators such as, for example, increased heart rate or pulse rate, and comparing the monitored indicators to threshold activity levels. The drug delivery device 202 may adjust monitoring of the indicators and any thresholds based on learned behavior and patterns of the user.

FIG. 6A illustrates an example process implemented when the AP application initiates a hyperglycemia protect mode. The process 600 enabled by the AP application when executed by a controller or process may implement a hyperglycemia protect mode. The hyperglycemia protect mode may involve relaxation of insulin delivery constraints at 610. In the example, the insulin delivery constraints may be limited over a specified or predetermined period of time. In another example, the hyperglycemia protect mode of operation may, at 610, relax the insulin delivery constraints if the user continues having insulin deliveries limited by the relaxed constraints during earlier activations of the hyperglycemia protect mode of operation.

The process 600 may also proceed to 620 at which the thresholds for triggering hyperglycemia alarms may be lowered. In addition, the process 600 may enable the blood glucose setpoint (i.e., the user's target blood glucose level) to be reduced (630).

The limits of the AP system's (or any algorithm executed by the drug delivery system 202) total possible insulin delivery over a duration may change gradually, instead of instantly, based on an observed increase in mean glucose concentration values. In other examples, the hyperglycemia mode may change parameters or inputs of the AP application (e.g., a cost function or gain) to cause the AP application to be less conservative and/or more aggressive in the determination of insulin dosage amounts and in the delivery schedules of the determined insulin dosage amounts.

FIG. 6B illustrates an example process implemented with the AP application initiates a hypoglycemia protect mode. The process 601 enabled by the AP application when executed by a controller or process may implement a hyperglycemia protect mode. The hypoglycemia protect mode process 601 may include reducing maximum insulin delivery limit (611). The maximum insulin delivery limit may be a maximum amount of insulin the AP application is permitted to deliver to a user in a given period of time, such as, for example, 8, 24, 48 or 72 hours, or the like. The reduced maximum insulin delivery limit at 611 may be maintained, for example, over a specified or predetermined period of time. The maximum insulin delivery limit may be personalized to the user such as a multiple of the user's basal rate. In other examples, the hypoglycemia mode of operation may change parameters or inputs of the AP application (e.g., cost function or gain) implemented by the drug delivery device 202 to cause the AP application to be more conservative.

At 612, the process 601 may reduce the basal input to the AP application, for example, being executed by a controller 221 of the drug delivery device 202. The reduced basal input may indicate to the AP application that a reduced basal insulin dosage that may be different than the basal input indicated by the user. For example, the basal input may be a basal insulin delivery value input by a user as part of a user's standard basal insulin dosage setting by the user, who may not have all the blood glucose measures, calculations of insulin on board, insulin sensitivity, other diabetes treatment plan information, or the like that the AP application has or is able to access and process. In response to being provided with the basal input, the AP application may correspondingly process the basal input and determine to reduce the amount of insulin delivery even when the user's standard basal insulin dosage settings as indicated by the provided basal input remain substantially the same.

At 613, the AP application may increase a blood glucose setpoint. For example, a user may have their blood glucose setpoint set at 100 mg/dL, in step 613, the AP application when in the hypoglycemia protect mode, may increase the blood glucose setpoint to 130 mg/dL or greater. As noted above, hypoglycemia may be induced by intense physical activity. In the hypoglycemia protect mode, the AP algorithm executing on the drug delivery device 202 may as part of any of steps 611-613, recommend with a prompt presented on a user interface or the like that the user intake carbohydrates prior to any planned exercise or during exercise based on, for example, a scheduled time of exercise, a detected glucose rate, a determined amount of insulin on board, or any combination thereof.

In an example, the hypoglycemia protect mode of operation may further include a step of reducing insulin delivery if the user experiences increased instances of hypoglycemia during earlier activations of the hypoglycemia protect mode of operation.

To ensure proper use of the available hypoglycemia protect mode, the drug delivery device 202 may ensure entry into this available mode of operation even when the user forgets to manually specify activation (e.g., forgetting to request the mode of operation prior to exercising).

In further examples, alerts may be provided by the AP application may generate alerts for output the user regarding the hypoglycemia protect mode of operation or automatic entry into the mode may occur when, for example, increased activity is detected, and the mode is not selected and/or when a location associated with increased activity levels is detected and the mode is also not selected for output via the user interface 227 or user interface 268 of the management device 206. Under these scenarios, the drug delivery device 202 may alert the user to the detected conditions, as described herein. To facilitate entry into the hypoglycemia protect mode of operation even when not specified by the user, the AP application executing on the controller 221 of the drug delivery device 202 may implement techniques to monitor the following conditions and provided feedback to the user. For example, the AP application may determine user activity is increased based upon motion data and biometric sensing, for example, by the IMU 207 or other sensor; and the user is in a geographic location where increased activity has been previously detected (e.g., based on increased activity in certain recognized locations).

By detecting activity levels and locations (e.g., via a GPS device, Wi-Fi location service or device, or another location determination device or sensor), the AP algorithm executing on the drug delivery device 202 may facilitate entry into the hypoglycemia protect mode of operation by alerting the user to the detected conditions where entry into the hypoglycemia protect mode of operation may be desired but has not occurred simply due to user error (e.g., the user forgot to enter the mode of operation). For example, the controller 221 of the drug delivery device 202 may upon execution of the AP application implement techniques that detect increased activity by the user (e.g., detects the user exercising) and/or detects locations where past increased levels of activity typically occur (e.g., recognizing locations such as a gym, a jogging trail or track, a swimming pool, a bike trail, a golf course, ice skating arena, soccer field, baseball field, football field, other sports field, beach, or the like as locations where the user typically exercises).

Techniques implemented by the drug delivery device 202, including during configuration of the drug delivery device 202, may enable the following parameters to be monitored and included with of the inputs associated with an activity level of a user received by the controller 221:

An "IncreasedActivityDetectionFlag"—allows higher activity to be automatically detected.

An "AllowLocationDetectionFlag"—allows the user to add locations associated with increased activity levels or for the locations to be automatically detected and stored for reference An "AllowAutoEntryInHypoProtectModeFlag"—allows the drug delivery device 202 to automatically enter the hypoglycemia protect mode of operation In addition, the AP application of the drug delivery device 202 may provide alerts to the user—for example, audible, tactile (e.g., vibrational), and/or visual alerts or similar alerts through the management device 206 or the user interface 227—to remind the user to enter into the hypoglycemia protect mode of operation if current activity levels of the user increase and/or predicted increased activity is expected.

Although some of the examples referenced the controller 221 of the wearable drug delivery device 202 performing some or all of the processes described in the foregoing examples, the disclosed subject matter should not be limited. For example, the described processes may also be performed by the processor 261 of the management device 206 or the processor 241 of the blood glucose sensor 204. Alternatively, some or all of the processes described in the foregoing examples may be distributed among the various processors or controllers, such as 261, 241 and 221 with information shared over the wired communication links 277, 278, 279 or wireless communication links 28, 288, 289.

The techniques described herein for providing an activity mode, hyperglycemia protect mode, or a hypoglycemia protect mode as described herein for a drug delivery system (e.g., the systems 100, 200 or any components thereof) may be implemented in hardware, software, or any combination thereof. Any component as described herein may be implemented in hardware, software, or any combination thereof. For example, the systems 100 and 200 or any components thereof may be implemented in hardware, software, or any combination thereof. Software related implementations of the techniques described herein may include, but are not limited to, firmware, application specific software, or any other type of computer readable instructions that may be executed by one or more processors. Hardware related implementations of the techniques described herein may include, but are not limited to, integrated circuits (ICs), application specific ICs (ASICs), field programmable arrays (FPGAs), and/or programmable logic devices (PLDs). In some examples, the techniques described herein, and/or any system or constituent component described herein may be implemented with a processor executing computer readable instructions stored on one or more memory components.

Some examples of the disclosed devices may be implemented, for example, using a storage medium, a computer-readable medium, or an article of manufacture which may store an instruction or a set of instructions that, if executed by a machine (i.e., processor or controller), may cause the machine to perform a method and/or operation in accordance with examples of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, programming code, and the like, implemented using any suitable high-level, low-level, object-oriented, visual, compiled and/or interpreted programming language. The non-transitory computer readable medium embodied programming code may cause a processor when executing the programming code to perform functions, such as those described herein.

Certain examples of the present disclosed subject matter were described above. It is, however, expressly noted that the present disclosed subject matter is not limited to those examples, but rather the intention is that additions and modifications to what was expressly described herein are also included within the scope of the disclosed subject matter. Moreover, it is to be understood that the features of the various examples described herein were not mutually exclusive and may exist in various combinations and permutations, even if such combinations or permutations were not made express herein, without departing from the spirit and scope of the disclosed subject matter. In fact, variations, modifications, and other implementations of what was described herein will occur to those of ordinary skill in the art without departing from the spirit and the scope of the disclosed subject matter. As such, the disclosed subject matter is not to be defined only by the preceding illustrative description.

Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of example examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. A wearable drug delivery system, comprising:
   a reservoir configured to store a liquid drug;
   a pump mechanism operable to expel doses of the liquid drug from the reservoir;
   an inertial measurement unit operable to detect an activity level of a user; and
   a controller communicatively coupled to the pump mechanism and the inertial measurement unit, wherein the controller is operable to:
      automatically initiate an activity mode of operation based on a determined activity level change based on an input from the inertial measurement unit exceeding one or more activity mode thresholds, wherein the activity mode of operation is selected from a plurality of modes corresponding to different levels of activity;
      modify parameters used in calculation of doses of the liquid drug to be delivered to a user; and
      output a signal to cause actuation of delivery of the liquid drug via the pump mechanism according to the set activity mode.

2. The wearable drug delivery device of claim 1, wherein the activity mode of operation is a automatically turned off after a period of time after initiation.

3. The wearable drug delivery system of claim 1, wherein the activity mode of operation can be manually turned off by the user.

4. The wearable drug delivery system of claim 1, wherein the activity level of the user must also surpass an activity duration threshold before the activity mode of operation is automatically initiated.

5. The wearable drug delivery system of claim 1, wherein the controller is further operable to generate an alert via a user interface requesting confirmation of initiation of the activity mode of operation.

6. The wearable drug delivery system of claim 1, further comprising:
   a glucose sensor, and
   the calculation of doses of the liquid drug to be delivered to the user is further based on glucose level readings output from the glucose sensor.

7. The wearable drug delivery system of claim 6, wherein the glucose sensor is co-located with the controller.

8. The wearable drug delivery system of claim 1, further comprising:
   a smart accessory device comprising a communication device, a processor, and a memory.

9. The wearable drug delivery system of claim 8, wherein the smart accessory device is a smartwatch.

10. The wearable drug delivery system of claim 8, wherein the smart accessory device is a wearable fitness device.

11. The wearable drug delivery system of claim 1, wherein the controller is further operable to:
    in response to setting the activity mode to a first activity mode, setting a maximum insulin delivery to approximately 1 to 3 times an original basal rate of the user.

12. The wearable drug delivery system of claim 1, wherein the controller is further operable to:
    in response to setting the activity mode to a first activity mode, setting a basal rate input to an automated drug delivery algorithm equal to approximately 50% to 90% of an original basal rate of the user.

13. The wearable drug delivery system of claim 1, wherein the controller is further operable to:
    in response to setting the activity mode to a second activity mode, setting a target setpoint within a range of approximately 100 mg/dL to 120 mg/dL.

14. The wearable drug delivery system of claim 1, wherein the controller is further operable to:
    in response to setting the activity mode to a second activity mode, setting a maximum insulin delivery to approximately 3 to 6 times an original basal rate of the user.

15. The wearable drug delivery system of claim 1, wherein the controller is further operable to:
    in response to setting the activity mode to a second mode, reducing a hyperglycemia alarm threshold for triggering alarms for any glucose values above a predetermined value and duration.

16. The wearable drug delivery system of claim 15, wherein the predetermined value and duration are approximately 250 to 350 mg/dL and greater than approximately 30 minutes, respectively.

17. The wearable drug delivery system of claim 6, wherein the controller is further operable to:
    initiate a hyperglycemia protect mode based on inputs received from the glucose sensor,
    wherein initiation of the hyperglycemia protect mode causes further modification of parameters used in calculation of doses of the liquid drug to be delivered to the user.

18. The wearable drug delivery system of claim 6, wherein the controller is further operable to:

initiate a hypoglycemia protect mode based on inputs received from the glucose sensor,
wherein initiation of the hypoglycemia protect mode causes further modification of parameters used in calculation of doses of the liquid drug to be delivered to the user.

* * * * *